United States Patent
Iwakuni et al.

(10) Patent No.: US 6,922,400 B2
(45) Date of Patent: Jul. 26, 2005

(54) TRANSMISSION METHOD OF DIGITAL BROADCASTING, DIGITAL BROADCASTING RECEIVER, AND DIGITAL BROADCASTING STATION SYSTEM

(75) Inventors: Kaoru Iwakuni, Mie-ken (JP); Hiroki Furukawa, Osaka-fu (JP); Hirofumi Sone, Hyogo-ken (JP); Ryohei Imai, Kyoto-fu (JP); Ryoichi Sugimura, Hyogo-ken (JP); Shuichi Ninomiya, Osaka-fu (JP)

(73) Assignee: Matsushita Electric Industrial Co., Ltd., Osaka-Fu (JP)

( * ) Notice: Subject to any disclaimer, the term of this patent is extended or adjusted under 35 U.S.C. 154(b) by 860 days.

(21) Appl. No.: 09/761,106

(22) Filed: Jan. 17, 2001

(65) Prior Publication Data

US 2001/0015962 A1 Aug. 23, 2001

(30) Foreign Application Priority Data

Jan. 20, 2000 (JP) ........................................ 2000-014225

(51) Int. Cl.$^7$ .............................. H04J 3/12; H04J 1/00; H04Q 11/00
(52) U.S. Cl. ........................ 370/270; 370/487; 370/522
(58) Field of Search ................................ 370/270, 389, 370/390, 432, 312, 319, 321, 336, 344, 347, 442, 480, 535, 537, 485, 486, 487; 375/395, 316, 362, 364, 368

(56) References Cited

U.S. PATENT DOCUMENTS

| | | | |
|---|---|---|---|
| 5,848,352 A | | 12/1998 | Dougherty et al. |
| 6,067,332 A | * | 5/2000 | Taura et al. ................. 375/344 |
| 6,272,194 B1 | * | 8/2001 | Sakamoto .................... 375/368 |
| 6,330,293 B1 | * | 12/2001 | Klank et al. ................. 375/344 |
| 6,408,038 B1 | * | 6/2002 | Takeuchi ..................... 375/341 |
| 6,563,896 B1 | * | 5/2003 | Nomura et al. .............. 375/364 |
| 6,650,659 B1 | * | 11/2003 | Hamada et al. ............. 370/487 |

FOREIGN PATENT DOCUMENTS

| | | |
|---|---|---|
| JP | 11-146379 | 5/1999 |
| WO | WO 96/42145 | 12/1996 |
| WO | WO 97/09801 | 3/1997 |
| WO | WO 97/17776 | 5/1997 |
| WO | WO 99/22502 | 5/1999 |
| WO | WO 99/39466 | 8/1999 |

* cited by examiner

*Primary Examiner*—Brian Nguyen
(74) *Attorney, Agent, or Firm*—McDermott Will & Emery LLP

(57) ABSTRACT

Digital broadcasting for transmitting program data including at least one of digital audio data and digital video data with other information is carried out by using terrestrial waves. The program data, download data corresponding to contents of the program data, and reference information correlating the download data with the program data are multiplexing with each other. The multiplexing signals are transmitted over a specific frequency band.

23 Claims, 10 Drawing Sheets

TRANSMISSION METHOD OF DIGITAL BROADCASTING, DIGITAL BROADCASTING RECEIVER, AND DIGITAL BROADCASTING STATION SYSTEM

BACKGROUND OF THE INVENTION

1. Field of the Invention

This invention relates to a transmission method of digital broad casting, a digital broadcasting receiver, and a digital broadcasting station system that multiplex and transmit video, audio with and other data.

2. Prior Art of the Invention

The digital broadcasting technology has improved rapidly in these days so that various type of information could be transmitted as multiplexed data. Thereby many technologies are proposed that can provide broadcasting services added with high value, though it had been impossible to carry out such services by now. For instance, Japanese Laid-open publication No. 11-146379 discloses a technology that, at the same time of the usual broadcasting of audio and video by the satellite digital broadcasting, plural audio channel listening data for repeatedly transmitting a specific music for listening by respective audio channels are multiplexed with plural compressed download audio data for repeatedly transmitting a music compressed for the download corresponding to the listening audio data, and GUI (Graphical User Interface) screen data for selecting a music for listing or download by the remote control operation, and then those data are transmitted and received. The user side that receives thus multiplexed data is provided with a receiving device including an image output device, in which a necessary processing is taken on the GUI screen displayed on a display and then the object music can be downloaded while confirming to sending side.

However, the above conventional transmission method of digital broadcasting and the digital broadcasting receiver must repeat the transmission every one music using a dedicated audio stream. Thereby, in case of services of plural music, plural audio data must be multiplexed as audio stream. Therefore, mass transmission capacity is required.

As a result, the technology disclosed in the above Japanese Laid-open publication No. 11-146379 presupposes the satellite broadcasting provided with the mass transmission capacity, and it is evident that it cannot be carried out under the digital broadcasting adopting the terrestrial waves with relative less transmission capacity. Additionally, the operations for selecting a music for listening and instructing to download the music are complicated because of using the GUI screen and the remote controller, so that there is a need of a device provided with image input means. Therefore, it is not preferable that the system is applied to a mobile' equipment and a vehicle equipment.

SUMMARY OF THE INVENTION

The present invention is suggested in order to settle the abovementioned problems in the prior arts, and has an object to provide the transmission method of digital broadcasting, the digital broadcasting receiver and the digital broadcasting system wherein the digital broad casting can be carried out easily under a configuration that uses terrestrial waves with relative less transmission capacity, the operations for selecting contents to be download are not complicated as those of using GUI screen, and it is possible to carry out high value added services that various data and multimedia contents corresponding to the program in the act of broadcasting can be downloaded in a simple manner at real time.

The invention is suggested in order to achieve the above objects, and presupposes a transmission method of digital broadcasting for transmitting program data including at least one of digital audio data and digital video data by multiplexing with other data.

The invention is characterized that, after multiplexing the program data, download data corresponding to the program data and reference information correlating the download data with the program data, the multiplexing signals are transmitted by the specific frequency band.

The download data is changed to an audio data file or a video data file digitalized like music data, thereby a user can download the music data while listening the program on the air. In addition, it is preferable that the transmission of the download data is performed later than the transmission of the program data correlated by the reference information. Otherwise, it is preferable to be transmitted repeatedly during the period extending over the end time of the program data.

The reference information may be transmitted as transmission frames other than the frames composing the transmission unit of the program data, or may be transmitted as part of transmission frames of the program data.

The reference information may include effective period information for the pointer information and ID information of the effective frequency band for the pointer information.

The multiplexing transmission data transmitted as above are received by the under mentioned receiver. That is to say, the receiver is provided with a function of outputting the program data out of those multiplexing information.

And the data decoder extracts the download data obtained from the de-multiplexer, which is provided to a user's download. At this time, the download of the specific download data is executed by referring to the reference information obtained from the reference information decoder. Since a user can input the download instruction from an operation input means, the control means at the receiving of the instruction inputted from the operation input means controls the storage means to store the download data specified by the reference information.

The judgment whether the effective reference information data are separated and outputted by the de-multiplexer can be understood according to a displayed state on a first displaying means. Additionally, the judgment whether the storage of the download data ends successfully can be understood according to a displayed state on a second display means. Moreover, it is useful that the storage means is a portable storage medium removable from the receiver.

The first display means displays not only the intention that the effective reference information can be obtained, and also can display the reason why the reference information is not effective in case of receiving the non-effective reference information. And the second display means displays not only the intention that the download data is successfully stored, and also can display the intention that the download data is being stored in the storage means, and the error message when the download data is not successfully stored in the storage means.

It is of cause that the broadcasting station system to carry out the above transmission method is provided with program editing means for editing the program composed of the program data including at least one of digital audio data and digital video data. In addition, the system is provided with the following means.

The download data preparing means prepares the download data correlated with the program data. The reference information preparing means prepares the reference information for correlating the download data with the program data updated according to the program. The multiplexing means multiplexes the program data with the download data and the reference information.

DESCRIPTION OF THE PREFERRED EMBODIMENTS (Embodiment 1)

The first embodiment of the invention will be described here referring to the drawings.

Figure 1:
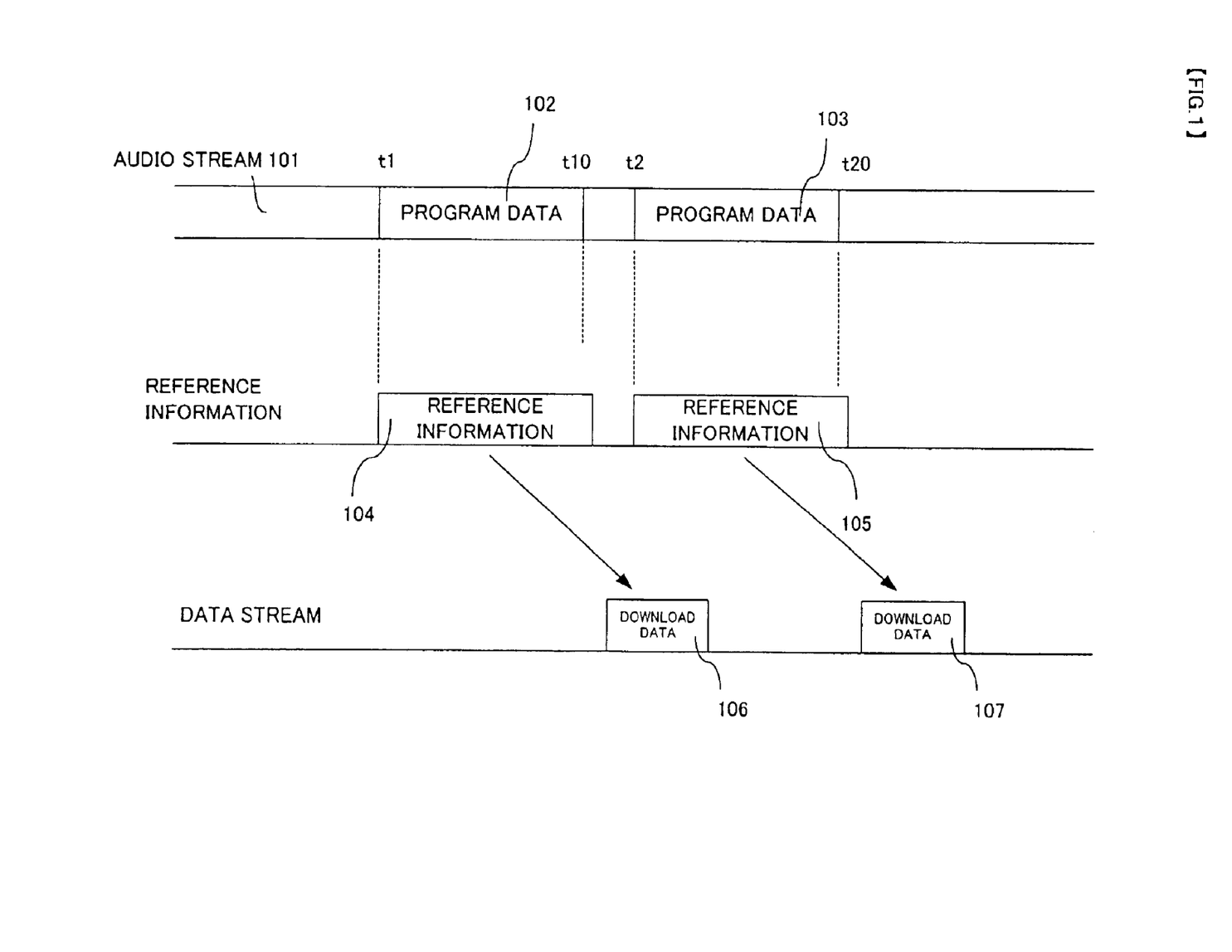
FIG. 1 is a block diagram showing an example of a transmission method of digital broadcasting of the first embodiment of the invention.

FIG. 1 is a time chart showing an outline of the transmission method of digital broadcasting regarding the first embodiment of the invention. The audio broadcasting services is explained as an example of this embodiment.

The audio broadcasting services is to transmit program data including audio data as audio stream 101, for example. The audio data composing the program data includes various materials of the program, and, because this embodiment takes the music program as an example, one component unit of program data is assumed to include a specific music or a specific music added with the short message (announcement) about the specific music.

Additionally, the digital broadcasting regarding the invention presupposes to adopt terrestrial waves with relative less transmission capacity (which is a very high frequency band or an ultra high frequency band), and to be received by vehicle equipment (the under-mentioned receiver), so that the invention is configured to adopt a transmission method suitable to such broadcasting method as described hereafter.

Specifically, FIG. 1 shows an example that over the audio stream 101 the first music is broadcasted from Time t1 as a program data 102 and consequently the second music is broadcasted from Time t2 as a program data 103. In addition, FIG. 1 denotes that along with the audio stream 101 a download data 106 corresponding to the program data 102 and a download data 107 corresponding to the program data 103 are transmitted as data streams.

These download data are contents to carry out the high value added services, of which materials are a compressed and coded data file of the same music as the ongoing one, still picture data of a jacket cover of the music CD of the music, character information data corresponding to the title of the music, and a compressed and coded motion picture data file showing scenes that the singer is singing.

In the above configuration, since the high value added services must be carried out by the digital broadcasting adopting the terrestrial waves with relative less transmission capacity, the music stream 101 is to share the same frequency band with the data stream.

Moreover, the invention is configured to repeat the transmission of the reference information 104 with one content for the period between the start time t1 and the end time t10 of the program data 102, and also repeat the transmission of the reference information 105 with one content for the period between the start time t2 and the end time t20 of the program data 103. The reference information 104 stores the information for correlating the program data 102 and the download data 106 (that is pointer information indicating the download data 106), while the reference information 105 stores the information for correlating the program data 103 and the download data 107 (that is pointer information indicating the download data 107).

The pointer information differs from each other according to the following multiplexing method or transmission method, but is defined as the information for specifying the prescribed download data. In case where the above 3 kinds of information are transmitted by the stream transmission under the time division system, it is possible to use as the pointer information an ID indicating the download data that is attached to the header of a frame composing a stream transmission unit.

Each start time and end time of the transmission of the download data 106 and 107 can be set up respectively according to the type of services. In this invention, in order to be able to download the object music even when a user sends the following download command shortly before the end of the program data 102 and 103, the object download data is configured to be transmitted later than each end time t10 and t20 of the program data 102 and 103.

If the transmission method is performed by multiplexing thus configured data, the under mentioned receiver can obtain the reference information for specifying the download data corresponding to one material of the program at any time when the program such as music is in the act of the broadcasting, therefore a user, if necessary, can surely obtain the download data (the object music) in accordance with the reference information. That is to say, the invention does not need complicated operations using the GUI screen like in the prior arts, so that even a user who is driving a car can download the object music by a simple operation.

In addition, the reference information may include effective period information for which the pointer information is effective, and ID information of the frequency band over which the pointer information is effective.

The effective period information indicates the period for which the pointer information included in the reference information is effective; that is to say, it is possible to execute the download for that period by making a use of the pointer information included in the reference information. If the invention adopts the configuration that such effective period information is included in the reference information, it is configured that the reference information is stored in the receiver side during the specific term as shown in the below, thereby it is possible to execute the download on demand.

The ID information of the effective frequency band for the pointer information is, as described above, the ID information about the frequency band on which the pointer information included in the reference information is effective; that is to say, the ID information of the broadcasting station where the pointer information included in the reference information is effective. If such ID information may be included in the reference information, even when different broadcasting stations use the same pointer information, it will not occur any trouble.

The above description explained the music broadcasting as an example, but it is needless to say that the invention can be applied to the audio broadcasting of which main content is the announcement. And the invention also can be applied to the broadcasting of which main service is video, without limiting the audio broadcasting. The above description expresses a case that one of reference information specifies one of download data, but it is configured that one of reference information can specify a plural download data simultaneously, or that plural reference information can specify one of download data. The description expresses that the download data is transmitted in a form of stream type, but the download data may be transmitted as divided pieces such as packet. In addition, the description expresses a case that the start and end time of the music data agree with the transmission period of the reference information, but those time can have a little time-difference from the transmission period. That is to say, the reference information may start to be transmitted shortly before the start time t1 (t2) of the music data, or the reference information may continue to be transmitted shortly after the end time t10 (t20).

Additionally, the field to which the invention is applied may include the EUREKA 147 digital audio broadcasting system (DAB), that is standardized by European Telecommunication Standard Institute (ETSI) as ETS300 401.

(Embodiment 2)

In the first embodiment of the invention described above, even a driving user can execute the download of the object music with a simple operation. However, if a user is located at the place under the bad receiving environment (for example, in a tunnel), it occurs that the download cannot be ended successfully.

Figure 2:
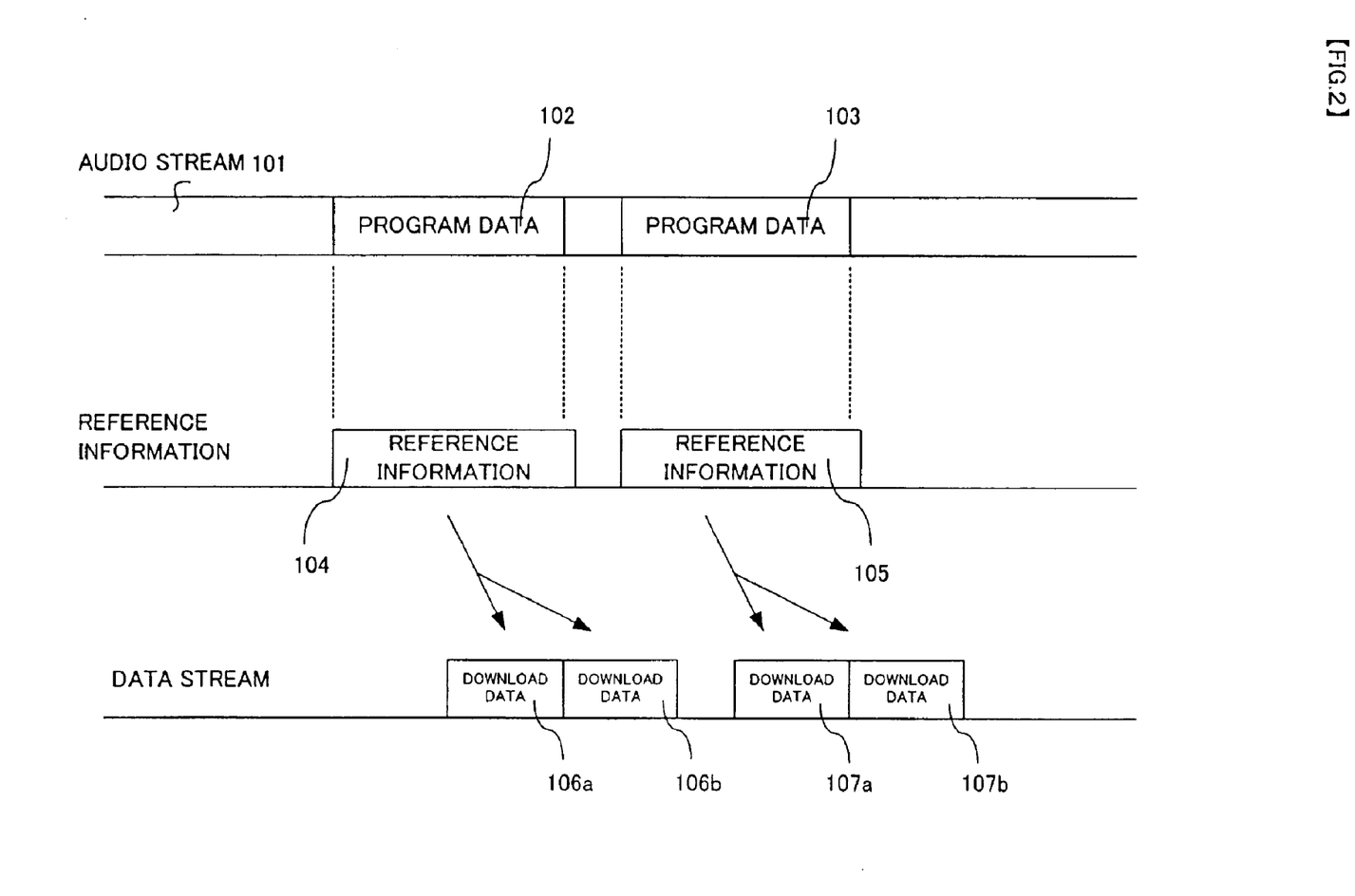
FIG. 2 is a block diagram showing an example of a transmission method of digital broadcasting of the second embodiment of the invention.

Therefore, the invention is configured to adopt the transmission method shown in FIG. 2 so as to execute the download of the object music speedy and exactly. In FIG. 2, the same part as the block diagram shown in FIG. 2 is given the same reference numerals as that of FIG. 2, and the explanation will not be described here.

In FIG. 2, it is configured that during the period extending over the end time of the reference information 104 and 105, the download data of the same content is transmitted two times over as shown as 106a, 106b and 107a, 107b. Since the download data is transmitted repeatedly with the same content, a user can download the first download data that is transmitted before the end of the program data, otherwise, if fail to download the first download data, he can download the second download data that is transmitted around the end time of the program data. Therefore, it is possible to carry out the speedy and accurate download. The above description expresses a case that the download data is transmitted two times over, but the number of repeats of the download and the position of repeating the download are limited to this.

(Embodiment 3)

The third embodiment of the invention will be explained referring to the drawings.

Figure 3:
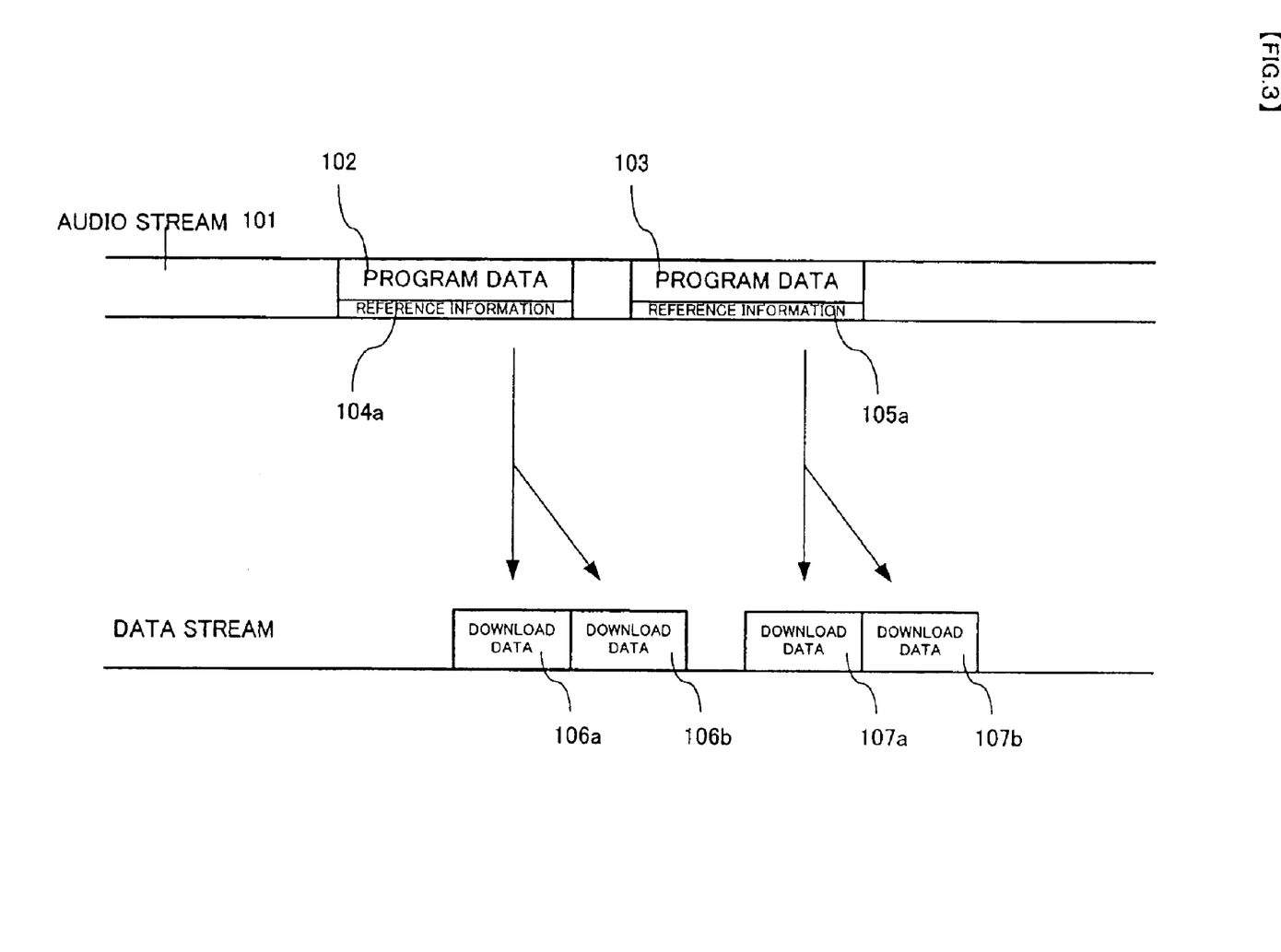
FIG. 3 is a block diagram showing an example of a transmission method of digital broadcasting of the third embodiment of the invention.

FIG. 3 is a block diagram showing an example of the transmission method of the digital broadcasting regarding the third embodiment of the invention. In FIG. 3, the same parts as the configuration in FIG. 1 are given same reference numerals and those explanations are not described here.

Figure 4:
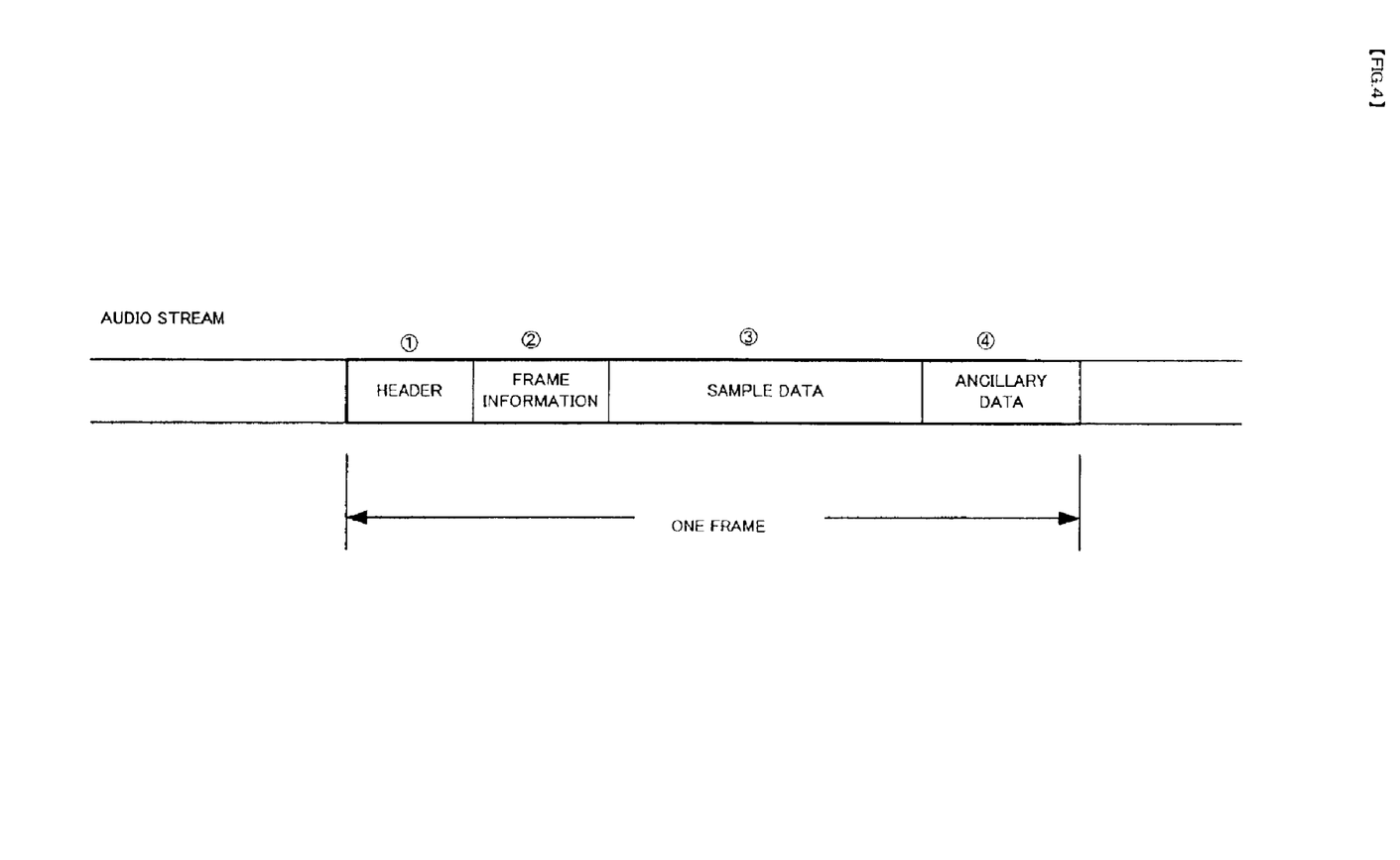
FIG. 4 is a diagram showing frame structures in a transmission method of digital broadcasting of the third embodiment of the invention.

Under the configuration shown in FIG. 3, the reference information 104a is transmitted as part of transmission frames composing the program data 102, and the reference information 106a as part of the transmission frames composing the program data 103, at the same time of transmitting respective program materials. The frame structure of MPEG layer 2 is illustrated in FIG. 4 as an example of audio coding method capable of transmitting such audio stream 101. The frame structure of MPEG layer 2 in FIG. 4 includes an ancillary data area (ancillary information area) ④ at the end of the frame, in which the reference information can be written. In the frame structure of MPEG layer 2 in FIG. 4, a header ① includes the coding method, the bit rate, and the sampling frequencies; a frame information② stores the bit allocation information necessary for decoding the frame and for the bit weighting; a sample data area ③ in which the sampling digital audio bit is written. Additionally, by transmitting those frames in time sequence many times, one program data 102 (or 103) is formed. Therefore, according to the specific program, the same reference information is written in each ancillary data area ④.

Since the invention based on this embodiment does not need the transmission of the reference information by using the independent frames, the multiplexing becomes easy, and at the same time it is possible to the more accurate transmission of the reference information. The prescribed description takes MPEG layer 2 as an example of audio coding method, but it is needless to say that other various coding methods can store the reference information in the similar area.

Moreover, it is needless to say that the reference information transmitted as part of the transmission frame may include not only the pointer information but also the effective period information for the pointer information and the ID information of the effective frequency band for the pointer information as described above.

(Embodiment 4)

Figure 5:
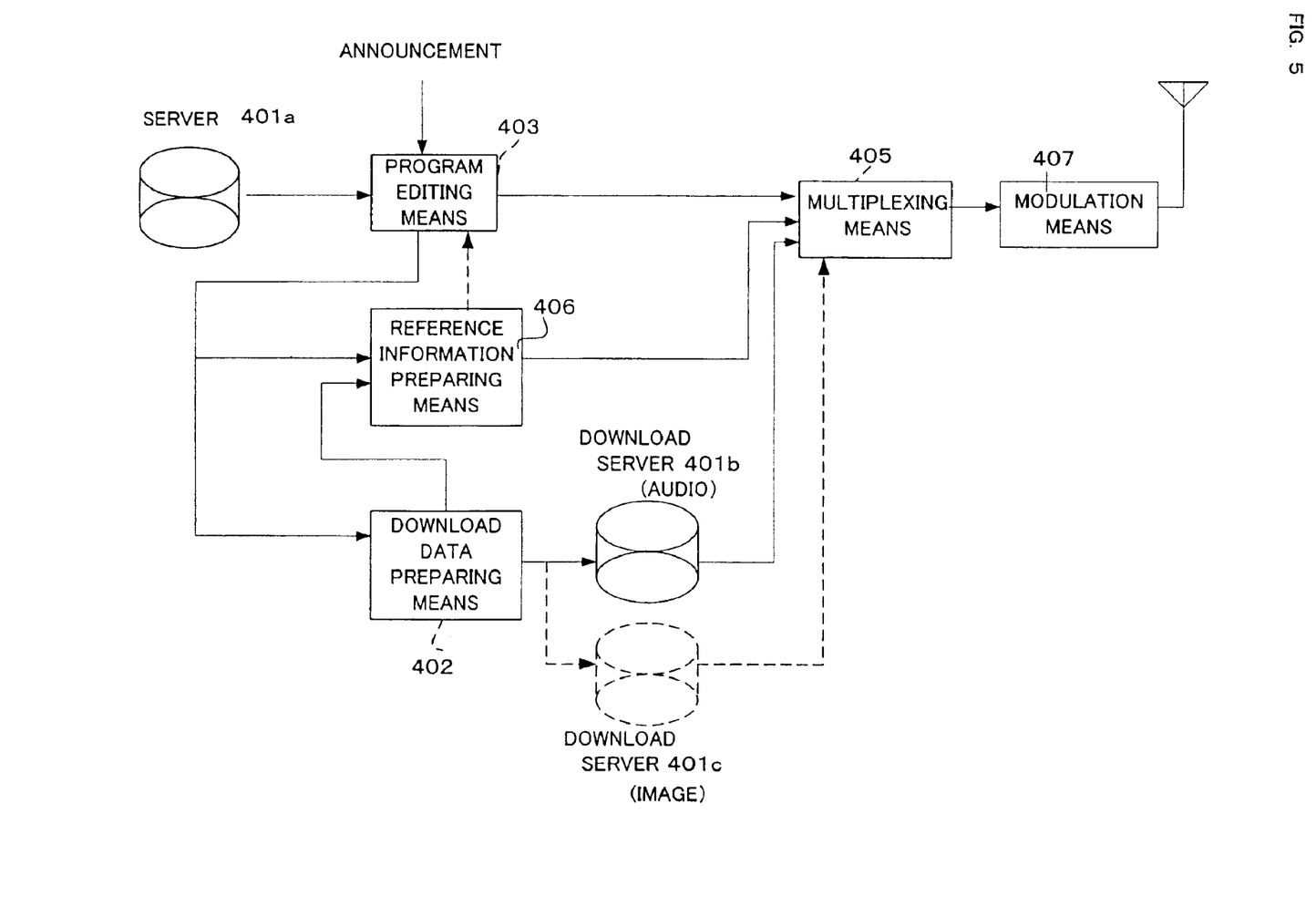
FIG. 5 is a block diagram showing a broadcasting station of the invention.

FIG. 5 is a block diagram showing a configuration of the broadcasting station system of the present invention.

The server 401a has stored audio data such as a music composing principal information of the program; while the server 401b has stored audio data for download. The audio data stored in the server 401a are sometimes edited so as to cut down the time of the musical performance according to the broadcasting hour and the program contents, or to previously add any audio data of announcement to the audio data. Meanwhile, because it is consider that a user downloads a specific music or re-use the download data, the download data stored in the server 401b is data including only music that is not edited like the audio data stored in the server 401a, but is coded in advance.

If it is necessary to attach image data such as photographs of the CD-jacket to the music data stored in the server 401b, another server 401c must be provided.

Regarding at least the audio part, that of the principal information of the program can be common to that of the information for the download. Therefore, the audio data may be stored in either one of the servers, and then the audio data of the program can be prepared separating from the download data at the editing of the program.

In order that the program goes on according to the predetermined schedule, the program editing means 403 gives a time data for specifying the broadcasting time of the program data (start or end time, for example) and a music specifying data for specifying a music to be used by the program data to the server 401*a* and download data preparing means 402 mentioned below. Next, the program editing means 403 reads out the specified music one after another from the sever 401*a* at necessary time, and uses it for the editing of the program data 102, 103 . . . After adding with necessary information such as announcement information to be added to each program data 102, 103 . . . , the program editing means 403 sends out them. The edited program data are outputted after the coding (the compression), and inputted to the multiplexing means 405.

On the other hand, the download data preparing means 402 for controlling the server 401*b* storing the download data, in response to receiving the time data and the music specifying data from the program editing means 403, sends out the necessary download data at necessary time (if necessary, the image data stored in the server 401*c* is sent out together), which are inputted to the multiplexing means 405. Additionally, the download data preparing means 402 inputs the information (the pointer information) for specifying the download data to be sent out toward the reference information preparing means 406 as described hereafter.

In addition to the time data and the music specifying data, the reference information preparing means 406 also receives from the programming means 403 data required for the operation of this system (for example, account data) while receiving the pointer information from the download data preparing means 402. The time data is used for determining the time for outputting the reference information to the multiplexing means 405. The music specifying data and the pointer information are edited to the reference information, which are sent out to the multiplexing means 405 at the time determined based on the time data.

The program data, the reference information and the download data, those were inputted to the multiplexing means 405 as above, are multiplexed considering the time for carrying out the data transmission structure as shown in FIG. 1 to FIG. 3. The transmission data multiplexed as above is changed to stream data or in a form of packet, and the transmission signals are modulated by the modulation means 407 and then transmitted via cable or wireless.

Thus prepared transmission signals such as the program data A, the reference information B and the download data C, construct sets of plural frames as shown in FIG. 4.

Figure 6:
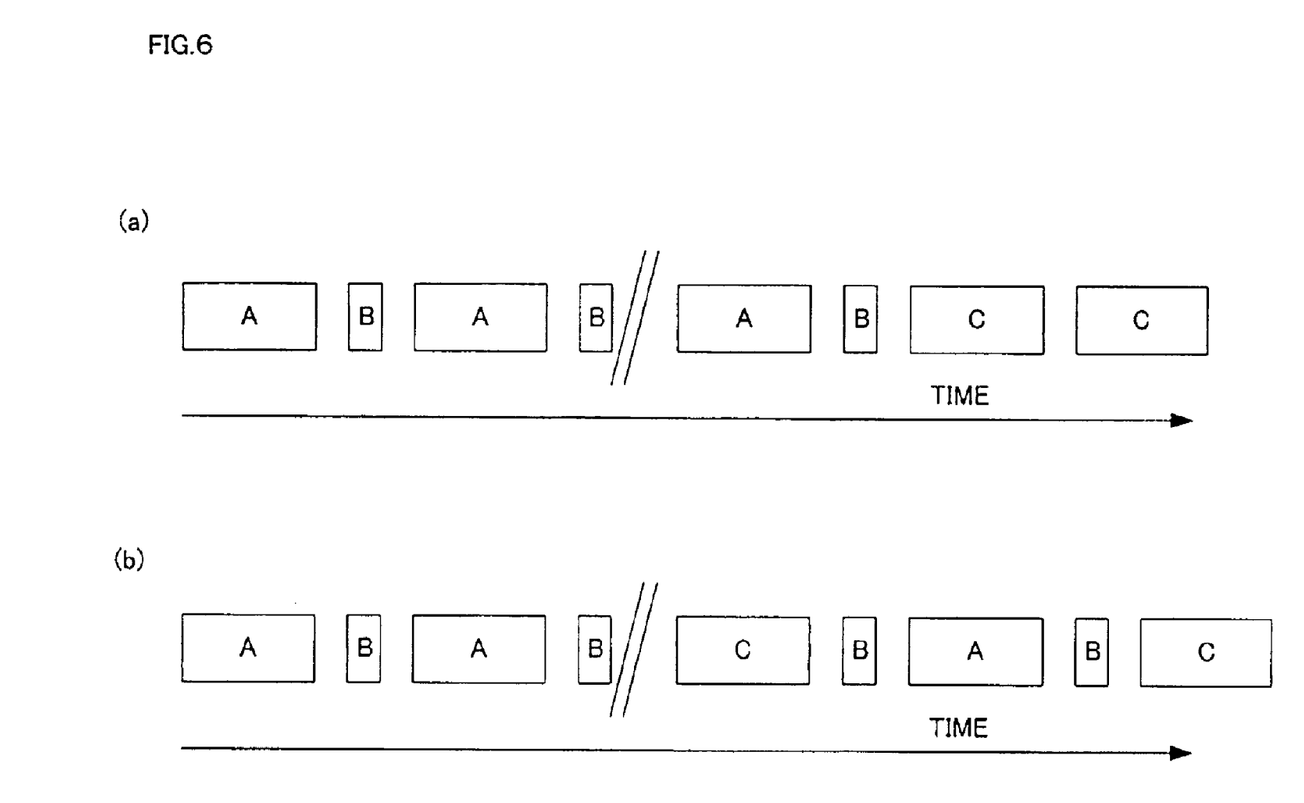
FIG. 6 is a conceptual diagram showing transmission signals of the invention.

In case of arranging those frames on the time axis, the reference information B is disposed between the program data A as shown in FIG. 6(*a*). In case of the configuration shown in FIG. 1, the download data C is inserted in the frame array after the repeats of the reference information B. In FIG. 1, however, part of the download data corresponding to the previous program data 102 is incorporated into the broadcasting time of the program data 103.

Additionally, in case of the configuration shown in FIG. 2, the corresponding download data C is inserted in the frame array before the end time of the reference information B as shown in FIG. 6(*b*). Further, in case of the configuration shown in FIG. 3, the program editing means 403 in FIG. 5 incorporates the reference information prepared by the reference information preparing means 406 with the frame, and handed it over the multiplexing means 405, thereby the program data A and the reference information B are transmitted as one frame.

(Embodiment 5)

Figure 7:
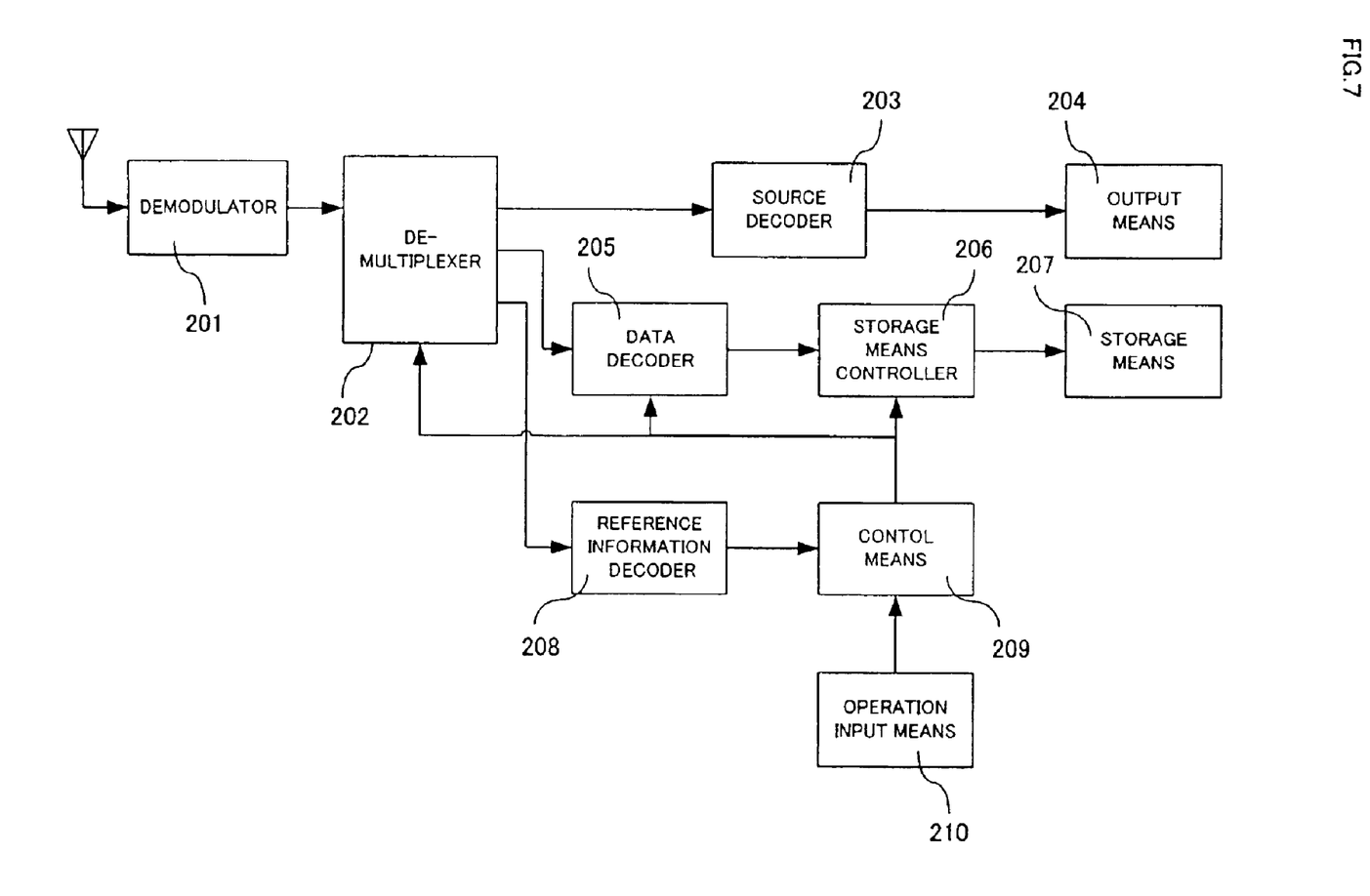
FIG. 7 is a block diagram showing a configuration of a receiver of the digital broadcasting of the fifth embodiment of the invention.

FIG. 7 is a block diagram showing a configuration of digital broadcasting receiver of the fifth embodiment in the present invention. The receiver configured as follows processes the transmission signals prepared by a broadcasting station.

In FIG. 7, the received signals are inputted into a demodulator 201 after the amplifying processing and etc. The demodulated signals are inputted into the de-multiplexer 202, and there the received signals are divided into video or audio stream, data stream for download, and the reference information. The video or audio stream of those data is handed over the source decoder 203, and after the decoding processing the data is outputted by the output means 204 such as a CRT or LC display and a speaker.

Meanwhile, the reference information obtained by the de-multiplexer 202 is extracted by the reference information decoder 208. Since the reference information is transmitted repeatedly with the same content during the broadcasting time of the specific program data 102 (or 103), the reference information decoder 208 outputs repeatedly the reference information of the download data corresponding to the specific program outputted from the output means 204.

Under those conditions, when a user of the digital broadcasting receiver inputs from the operation input means 210 an operation (the download instruction, for example) in response to the program outputted from the output means 204, the reference information at this time is inputted from the reference information decoder 208 to the control means 209 and stored there. At the same time, the control means 209 instructs the storage means controller 206 to be waiting while giving the reference information to the data decoder 205. A press button switch, a touch sensor of the displaying screen or a voice command can be utilized as the operation means 210.

On the other hand, the download data separated by the de-multiplexer 202 is inputted to the data decoder 205. The data decoder 205, at receiving the input of the download data specified by the reference information, sends the download data to the storage means controller 206 that is waiting. The storage means controller 206 stores the download data in the storage means 207. It is possible to utilize a portable recording medium such as IC memory, optical disk medium, magnet-optical disk medium, magnetic tape medium, and etc. for the storage means 207. The receiver is provided with storage medium installing means (not shown in the drawing) capable of removing the storage means 207.

The download data reproducing means that is added to the receiver or is separated from the receiver has a function to install the storage means 207 in itself and to read and reproduce the download data stored in the storage means 207 according to the above procedure, therefore it is possible to reproduce the object music easily.

The digital broadcasting receiver in the fifth embodiment of the present invention, while continuing to enjoy the video and audio program in the act of receiving, can store in the storage means download data including contents corresponding to program on the air by the simple operation The above-mentioned explanation denotes that one download data is stored by one time operation, and it also can be carried out that a plural data is stored by one time operation.

In addition, the time for giving the reference information stored in the control means 209 to the data decoder 205 is not limited particularly. That is to say, this time can be determined by a user's instruction from the operation input means 210. However, if such configuration is adopted, the effectiveness of the reference information is a problem, and this point is described after.

(Embodiment 6)

Next, the sixth embodiment of the present invention will be explained here referring to the drawings.

Figure 8:
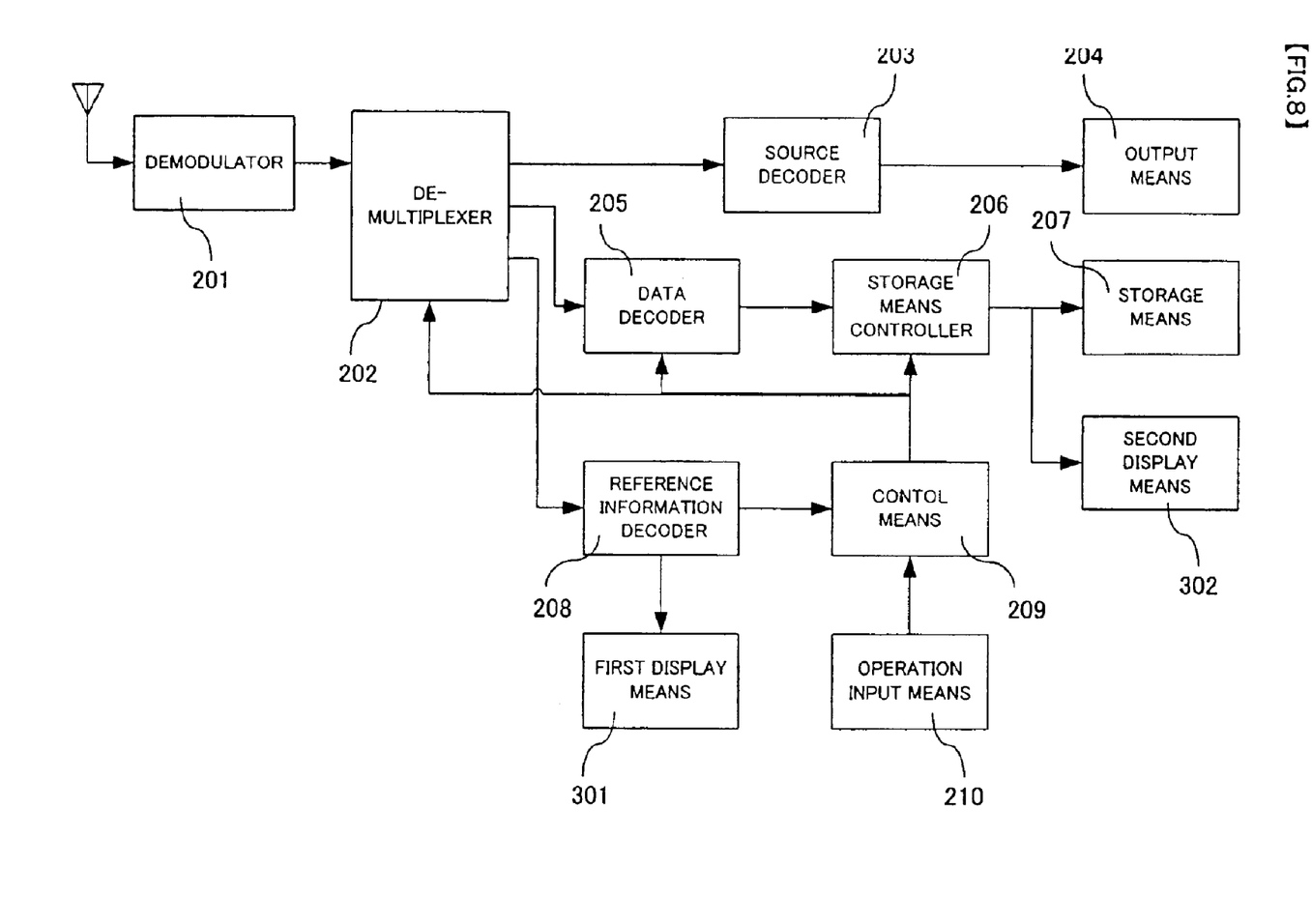
FIG. 8 is a block diagram showing a configuration of a receiver of the digital broadcasting of the sixth embodiment of the invention.

FIG. 8 is a block diagram showing a configuration of the digital broadcasting receiver in the sixth embodiment of the invention. In FIG. 8, the same parts as those of the block diagram in FIG. 7 are given the same reference numerals and the explanation is omitted here.

A first display means 301 displays the state that the reference information separated by the de-multiplexer 202 is inputted to the reference information decoder 208 and successfully decoded there, and then outputted as effective reference information.

A second display means displays the state that the storage controller 206 can successfully store in the storage means 207 the download data without trouble. A light emitter such as a light emitting diode, a voice generator such as a speaker or a buzzer, or an icon on the display screen can be utilized for the displaying means. Since the digital broadcasting receiver in the embodiment of the invention is provided with the above-mentioned display means, it is easy for a user to know the end of downloading the contents or the existence of the contents that he can select just now.

In the above explanation, it is configured that the first display means 301 displays an intention that the effective reference information can be obtained, but this invention is not limited to this. That is to say, if non-effective reference information is obtained, the first display means 301 can displays the reason why the reference information is not effective. For instance, the first display means may display a message that the time passes over the effective period if the present time is not within the effective period information for the pointer information, or a message that please change the broadcasting station if the broadcasting station selected at the present time is different from that of the ID information of the effective frequency band for the pointer information.

And in the prescribed explanation, the second display means 302 is to display the intention that the download data is successfully stored, but the invention is not limited to this. That is to say, the second display means 302 can display the intention that the download is running while the download data is being stored, or the error message when the storage of the download data is not stored successfully.

According to the outside view of the receiver, this embodiment of the invention is explained in detail hereafter.

Figure 9:
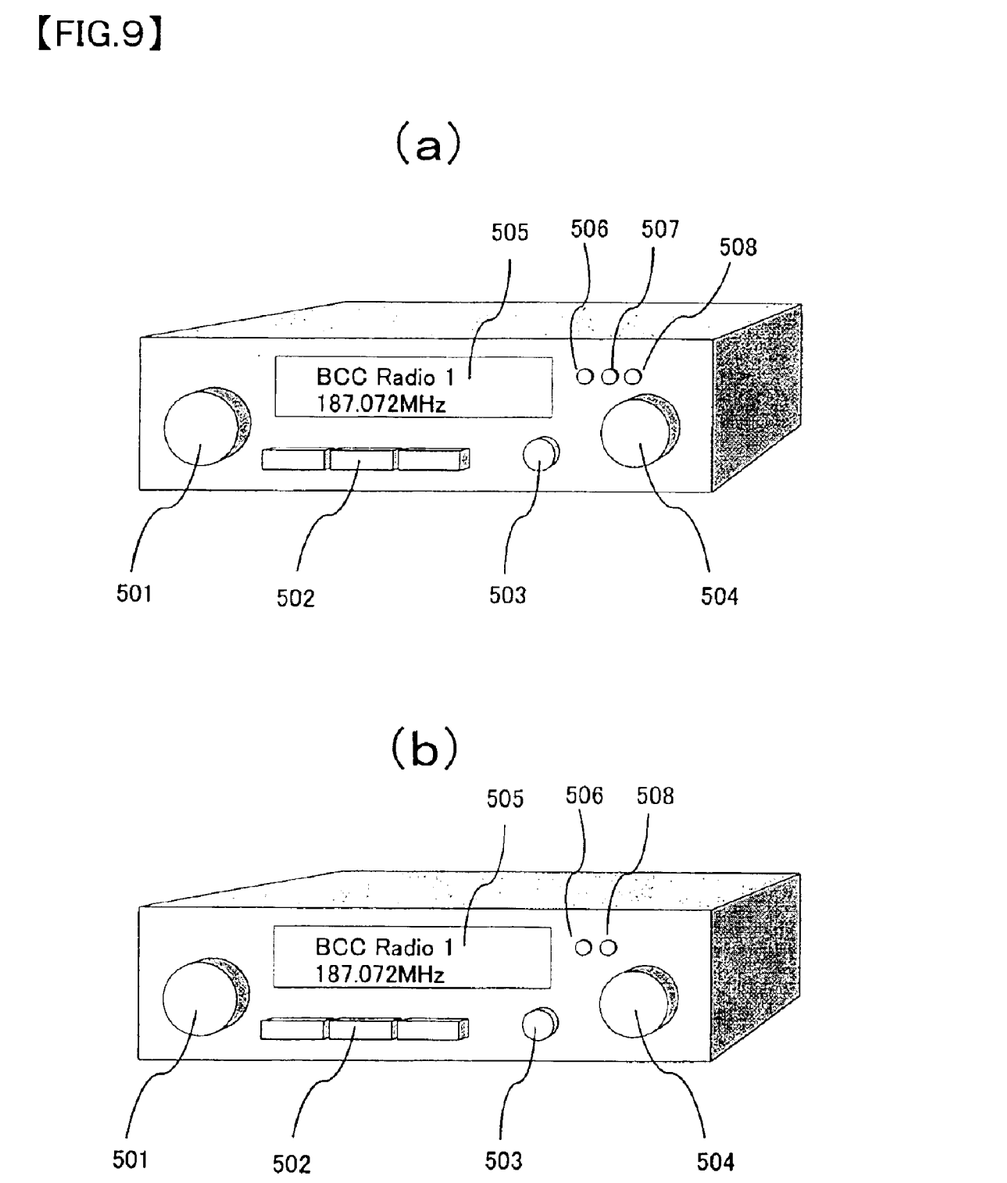
FIG. 9 is an outside view of a digital broadcasting receiver of the sixth embodiment of the invention.

The receiver shown in FIG. 9(a) turns on a lamp 506 when it becomes a state able to execute the download. When a user presses down the download button 503, a lamp 507 indicating the running of the download processing is turned on, and when the download ends, a lamp 508 is turned on.

It is configured as shown in FIG. 9(a) that the receiver is provided with three lamps that function as the second display means 302, but the invention is not limited to this. For instance, if the receiver is not provided with a lamp 507 indicating the state that the download is running, the invention can obtain the same effect. That is to say, the receiver as shown in FIG. 9(b) is configured to blink the lamp 506 while the download is running.

501 is a selection knob, 502 a preset selection button, 504 is a volume knob, and 505 is a display unit. The display unit 505 can be used as the second display means 302 as described below.

Figure 10:
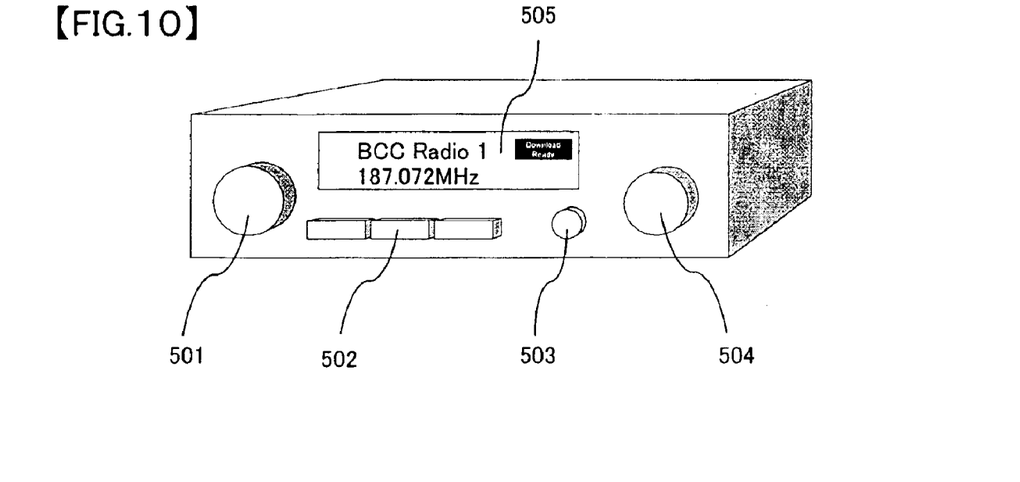
FIG. 10 is an outside view of another digital broadcasting receiver of the sixth embodiment of the invention.
Figure 11:
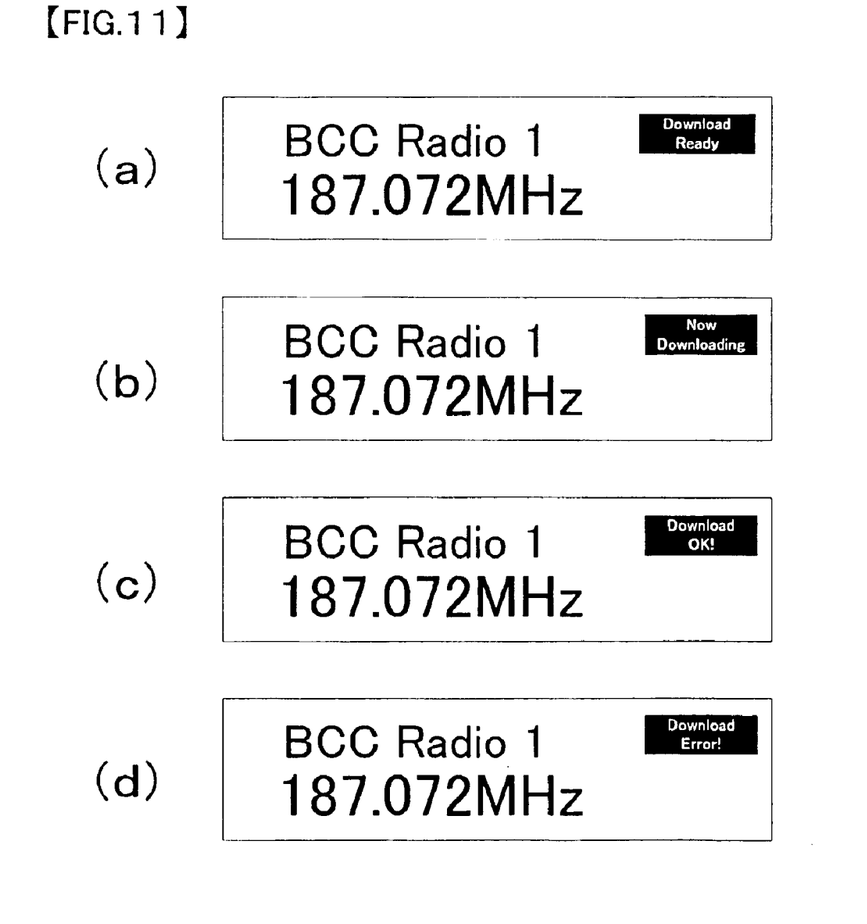
FIG. 11 is an enlarged view of a display of the digital broadcasting receiver of the sixth embodiment of the invention.

When it becomes the state able to execute the download, the display unit 505 of the receiver shown in FIG. 10 displays a message such as "Download Ready" and etc. as shown in FIG. 11(a). Thereby, a user pressed down the download button 503 and the display unit 505 displays a message such as "Now Downloading" and etc. as shown in FIG. 11(b). And when the downloading ends, a message such as "Download OK!" and etc. is displayed as shown in FIG. 11(c). In case of failing in the downloading, a message such as "Download Error!" is displayed on the display unit 505 as shown in FIG. 11(d).

If the display unit 505 is used as the second display means, even in the configuration without providing with lamps 506 to 508 it is possible to obtain the same effect. In addition, it is needless to say that the display unit 505 can be used as not only the second display means 302 but also the first display means 301.

In the above description, the present invention can carry out the transmission of the download data by the terrestrial waves with the less transmission capacity. And without sending any instruction or confirmation from the receiver side to the broadcasting station, a user can receive the download data easily. Additionally, since the operation of the receiver is very simple, it is possible to install the receiver loaded in the mobile device or the vehicle.

What is claimed is:

1. A transmission method of digital broadcasting for transmitting program data including at least one of digital audio data and digital video data multiplexed with other information, the method comprising the steps of:

multiplexing the program data, download data corresponding to the program data, and reference information correlating the download data and the program data to produce multiplexed signals; and transmitting those multiplexed signals by a specific frequency band, wherein the reference information includes at least pointer information for specifying the download data.

2. A transmission method of digital broadcasting according to claim 1, wherein the reference information further includes effective period information during which the pointer information is effective.

3. A transmission method of digital broadcasting according to claim 1, wherein the reference information further includes ID information of a frequency band over which the pointer information is effective.

4. A transmission method of digital broadcasting according to claim 1, wherein the download data is a digital audio data file or a digital video data file.

5. A transmission method of digital broadcasting according to claim 1, wherein the reference information is transmitted as part of frames composing a transmission unit of the program data.

6. A transmission method of digital broadcasting according to claim 1, wherein the multiplexed signals are the ensemble based on the EUREKA 147 Digital Audio Broadcasting (DAB) standard.

7. A transmission method of digital broadcasting according to claim 1, wherein the specific frequency band is a very high frequency band or an ultra high frequency band.

8. A transmission method of digital broadcasting for transmitting program data including at least one of digital audio data and digital video data multiplexed with other information, the method comprising the steps of:

multiplexing the program data, download data corresponding to the program data, and reference information correlating the download data and the program data to produce multiplexed signals; and transmitting those multiplexed signals by a specific frequency band, wherein the download data is transmitted later than the program data correlated by the reference information.

9. A transmission method of digital broadcasting for transmitting program data including at least one of digital audio data and digital video data multiplexed with other information, the method comprising the steps of:

multiplexing the program data, download data corresponding to the program data, and reference information correlating the download data and the program data to produce multiplexed signals; and transmitting those multiplexed signals by a specific frequency band, wherein the download data is transmitted repeatedly during the period extending over the end time of the program data correlated by the reference information.

10. A digital broadcasting receiver for receiving multiplexed signals generated by multiplexing program data including at least one of digital audio data and digital video data, download data corresponding to the program data, and reference information correlating the download data and the program data, and for outputting the audio data or the video data separated from the multiplexed signals, said receiver comprising:

a de-multiplexer for separating the multiplexed signals;

a data decoder for extracting the download data obtained from the de-multiplexer;

a reference information decoder for extracting the reference information obtained from the de-multiplexer;

operation input means for inputting a download instruction of a user;

storage means for storing at least the download data; and control means for controlling the storage means to store the download data specified by the reference information according to the instruction obtained from the operation input means and the reference information obtained from the reference information decoder.

11. A digital broadcasting receiver according to claim 10, wherein the reference information includes pointer information for specifying the download data.

12. A digital broadcasting receiver according to claim 11, wherein the reference information further includes effective period information for indicating an effective period of the pointer information.

13. A digital broadcasting receiver according to claim 11, wherein the reference information further includes ID information of a frequency band over which the pointer information is effective.

14. A digital broadcasting receiver according to claim 10, further comprising first display means for displaying whether the reference information separated by the de-multiplexer is effective or not.

15. A digital broadcasting receiver according to claim 14, wherein the first display means displays that the reference information includes information of a non-effective period.

16. A digital broadcasting receiver according to claim 14, wherein the first display means displays that the reference information includes ID information of a non-effective frequency band.

17. A digital broadcasting receiver according to claim 10, further comprising second display means for displaying a normal end of storing the download data in the storage means.

18. A digital broadcasting receiver according to claim 10, further comprising second display means for displaying a running state that the download data is being stored in the storage means.

19. A digital broadcasting receiver according to claim 10, further comprising second display means for displaying an error message in case where the download data is not successfully stored in the storage means.

20. A digital broadcasting receiver according to claim 10, wherein the storage means is a portable storage medium removable from the receiver.

21. A digital broadcasting station system for editing program data including at least one of digital audio data and digital video data by program editing means, and for multiplexing the program data with other information, and then modulating and transmitting them, the system comprising:

download data preparing means for preparing download data corresponding to the program data;

reference information preparing means for preparing reference information correlating the download data with the program data; and multiplexing means for multiplexing the program data, the download data and the reference information, wherein the reference information includes at least pointer information for specifying the download data.

22. A digital broadcasting station system according to claim 21, wherein the reference information further includes effective period information during which the pointer information is effective.

23. A digital broadcasting station system according to claim 21, wherein the reference information further includes ID information of a frequency band over which the pointer information is effective.

* * * * *